(12) United States Patent
Wislinski et al.

(10) Patent No.: US 6,396,991 B1
(45) Date of Patent: May 28, 2002

(54) FIBER TRANSPORT HOLDING DEVICE AND METHOD

(75) Inventors: Martin T. Wislinski, Edison; Victor J. Talamini, Sr., Asbury, both of NJ (US); Stephen W. Sedgwick, Glenside, PA (US)

(73) Assignee: TyCom (US) Inc., Morristown, NJ (US)

( * ) Notice: Subject to any disclaimer, the term of this patent is extended or adjusted under 35 U.S.C. 154(b) by 0 days.

(21) Appl. No.: 09/478,814

(22) Filed: Jan. 7, 2000

(51) Int. Cl.[7] .................................................. G02B 6/00
(52) U.S. Cl. ...................................... 385/135; 385/134
(58) Field of Search ............................... 385/135, 134, 385/147, 95–99, 136, 137, 145

(56) References Cited

U.S. PATENT DOCUMENTS 6,009,224 A * 12/1999 Allen ......................... 385/135

* cited by examiner

Primary Examiner—Phan T. H. Palmer

(57) ABSTRACT

A method for interconnecting at least one pair of optical fibers attached to an amp pair and devices used for transporting the amp pair including a splicing station and an apparatus for holding a plurality of optical fibers is diclosed. The method includes storing each of the optical fibers on a fiber transport attached to the amp pair, placing the amp pair into a splicing station, splicing at least two of the optical fibers and receiveing fiber transports on a holder attached to the amp pair. An apparatus for suppporting an amp pair having a plurality of fiber transports associated therewith includes a base defining a plurality of cavities adapted to hold the fiber transports and an aperture adapted to surround the amp pair. An apparatus for holding a plurality of optical fiber transports includes a fixture adapted to mount the optical fiber storage assembly and to separately receive each optical fiber transports from a plurality of optical fiber transports.

46 Claims, 6 Drawing Sheets

FIBER TRANSPORT HOLDING DEVICE AND METHOD

CROSS-REFERENCES TO RELATED APPLICATION

This invention relates to the following co-pending applications, which are incorporated by reference: "Device for Separating Portions of Spooled Optical Fibers", application Ser. No. 09/317,827, filed May 25, 1999; and "Amp Pair Assembly Fixture", application Ser. No. 09/478,813, filed Jan. 7, 2000.

FIELD OF THE INVENTION

The present invention relates to the field of optical amplifiers and, more particularly, to a method and apparatus for holding optical fiber transports.

BACKGROUND OF THE INVENTION

Submarine fiber optic communication systems carry a large majority of the information that is transmitted between the world's continents. These fiber optic communication systems remain in-place on the bottom of the ocean under thousands of feet, and even miles, of water for years at a time. Due to the difficulties encountered when having to repair, replace, or generally service these systems, it is desirable that these systems be highly reliable.

Submarine fiber optic communication systems typically include repeaters that appear at regular intervals along the spans of undersea cables to amplify the optical signals traversing the constituent fibers. Other assemblies that may be found along a submarine communication system include branching units, which allow multiple cable stations to be served from a single cable. To protect the sensitive components and/or connections that are housed within these submerged assemblies, a rugged hermetically sealed structure must be employed.

Typically, the optical fibers found within optical repeaters are circular in cross-section, and are constructed of glass surrounded by a protective jacket that is thicker than the glass. For example, a typical glass fiber ("glass fiber", "bare fiber", or "unjacketed fiber") can have an outer diameter of approximately 0.010 inches, and a typical jacketed fiber can have an outer diameter of approximately 0.040 to 0.060 inches.

The glass fiber is fragile. Because even microscopic damage to the glass fiber can adversely affect the reliability of the optical repeater (and, as a result, the reliability of the entire submarine optical fiber cable system), great efforts are normally taken to protect the glass fiber from damage. Generally, the likelihood of damage to the glass fiber can be reduced by ensuring that any curvature in the glass fiber meets or exceeds the minimum bending radius of the glass fiber. However, the minimum bending radius of the glass fiber is a function of the expected life of the glass fiber. For example, when at least a 25-year life is expected, the glass fiber typically has a minimum bending radius of approximately 1 inch. This is referred to as the reliability-adjusted minimum bending radius of the glass fiber, because meeting or exceeding this value provides acceptable reliability from bending damage during the expected life of the glass fiber.

Typically, the optical components found within optical repeaters are manufactured with a segment of optical fiber attached at each end and cut to a specified length. Each fiber segment contains a jacketed portion of specified length located adjacent to the optical component, and a bare portion of specified length extending from the opposite end of the jacketed portion. The bare portion is spliced into the bare portion of another segment in the repeater's optical circuit. Creating these splices can be a complicated task, requiring substantial lengths of bare fiber on each side of the splice.

Optimally however, the repeater or branching station is designed to be as space-efficient as possible, thereby minimizing its production, storage, shipping, and installation costs. Thus, it is desirable to store each optical fiber segment in the most space-efficient manner possible.

Typically, this involves storing the fiber in a coiled configuration on a tray upon which are mounted at least some of the optical components served by that fiber. Typical trays include a well that extends partially through the thickness of the tray, and an elongated circular spool surrounded by the well. A gap between the spool and the well defines a fiber storage space within which the coiled fibers can rest.

An improvement in this storage approach is described in the United States Patent Application titled "Device for Separating Portions of Spooled Optical Fibers", application Ser. No. 09/317,827, filed May 25, 1999, which is incorporated herein by reference. This improved storage approach was developed at least partially in response to the design requirements of a new repeater, which was designed to provide repeater services for a substantially increased number of optical fiber communication connections. The new repeater has a substantially different physical architecture than the earlier model repeaters. The new repeater employs a plurality of optical amplifier pairs ("amp-pairs") that amplify the signal on a full duplex optical fiber communication connection, which is also known as a fiber pair. Each amp-pair includes a plurality of optical component trays containing optical components connected by optical fibers that are stored in a fiber storage space on that tray. In addition, each optical component tray has at least two optical fibers associated therewith.

During assembly, the optical fibers of the optical component trays can be connected by splices to form a working optical amplifier. Because an amp-pair may be moved through several stations during the assembly process, there is a need for protecting the optical fibers during the transport. For example, optical fibers could be damaged if they come into contact with sharp objects that may scratch the surface of the fiber. Such damage, while possibly not readily apparent, could reduce the working life of the optical fiber substantially and result in a faulty optical amplifier. Therefore, there is a need for protecting the optical fibers during transport from one assembly station to another.

In addition, once a given amp pair is assembled and its optical fibers have been interconnected, a need can arise to test the optical performance of that amp pair. Such testing can require accessing the ends of one or more fibers from a fiber storage space of the amp pair. Frequently, the fiber of interest is not the outer-most fiber in the storage space, but is instead located beneath other optical fibers. In this situation, the outer-most fibers must be temporarily removed from the storage space and set aside until activities involving the fiber of interest are completed.

Typically, this is accomplished by coiling each fiber around an optical fiber transport, and stacking the optical fiber transports together on a common pin. This creates a problem, however, because each fiber can not be independently accessed. Instead, to access a fiber coiled about a transport that is low in the stack, the upper transports must be temporarily removed from the common pin. Each movement of a transport, however, increases the risk of damage to the fiber coiled on and extending from that transport. Therefore, there is a need for a device and method for temporarily storing the optical fibers normally stored in the fiber storage space of the tray such that each fiber remains independently accessible.

SUMMARY OF THE INVENTION

An embodiment of the present invention provides a method for interconnecting at least one pair of optical fibers attached to an amp pair, the method including storing each of the optical fibers on a fiber transport attached to the amp pair, placing the amp pair into a splicing station, moving the fiber transports, splicing at least two of the optical fibers; and receiving fiber transports on a holder attached to the amp pair.

According to one embodiment of the invention, a device for storing and transporting fiber transports includes a plurality of storage slots that removably hold the fiber transports.

Other embodiments of the present invention provide a device for holding a plurality of optical fiber transports associated with an optical fiber storage assembly. The device includes a fixture adapted to mount to the optical fiber storage assembly. The fixture is also adapted to separately receive each optical fiber transport from the plurality of optical fiber transports.

BRIEF DESCRIPTION OF THE DRAWINGS

The invention will be more readily understood through the following detailed description, with reference to the accompanying drawings, in which.

DETAILED DESCRIPTION

As stated above, each optical component tray can have at least one pair of optical fibers associated with it. Once the individual optical component trays are assembled into an amp pair unit, the optical fibers associated with each tray can be wound on a fiber transport and the fiber transport can be stored on a fiber transport holder which can be attached to the corresponding tray. Then, the amp pair can be moved to a splicing station. The fiber transport holders can be removed from the amp pair, and their fiber transports stored prior to the splicing process such that the operator is able to readily access each optical fiber associated with each tray. In this manner the operator can splice a pair of optical fibers without disturbing other optical fibers.

Figure 1:
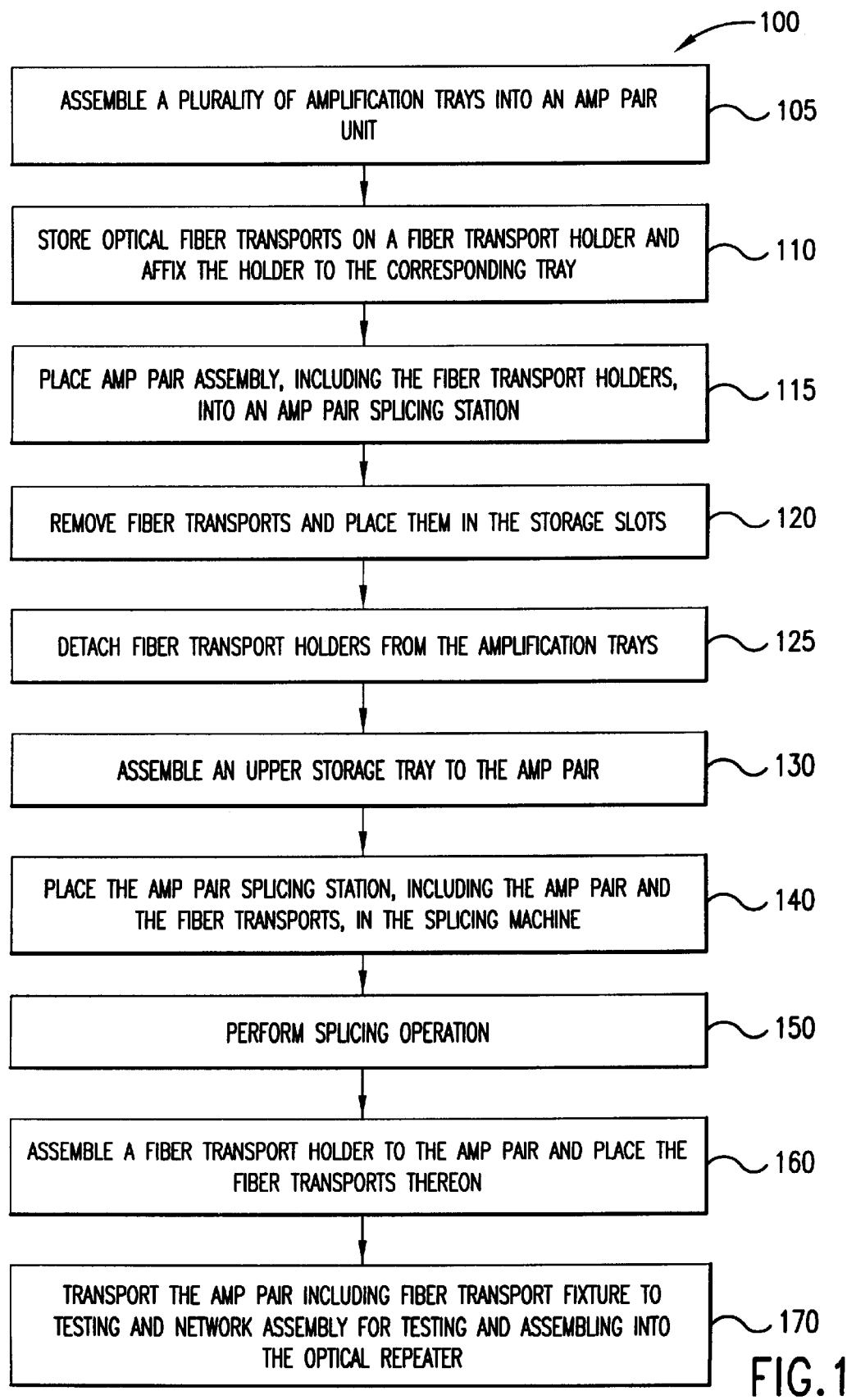
FIG. 1 is a flow chart of an embodiment of a process of the fiber transport holding method.

FIG. 1 is a flow chart of an embodiment of a process 100 of the fiber transport holding method. At step 105, a plurality of optical component trays can be assembled into an amp pair unit. This step can be typically accomplished by aligning and physically securing several optical component trays together. At step 110, one or more optical fiber transports can be stored on a fiber transport holder which can be affixed to a corresponding tray. At step 115, the amp pair unit, including the fiber transport holders, can be placed into an amp pair splicing station. At step 120, the fiber transports can be removed from the fiber transport holders and placed in storage slots provided on the amp pair splicing station. At step 125, the fiber transport holders can be removed from the amp pair assembly. At step 130, an upper storage tray ("storage tray") can be added to the amp pair. At step 140, the amp pair splicing station, including the amp pair, can be placed in a splicing machine. At step 150, a splicing operation can be performed to interconnect the optical components of the amp pair. At step 160, a fiber transport fixture can be attached to the amp pair. Also, the fiber transports can be moved from the splicing station to the fiber transport fixture. At step 170, the amp pair, including the attached fiber transport fixture and fiber transports, can be transported to testing and network assembly stations for testing and final assembling of the amp pair into an optical repeater.

While process 100 is presented in FIG. 1 in step-wise fashion, the invention is not limited to the order in which the process steps are presented and should not be construed as limited thereto. Moreover, it would be apparent to those of ordinary skill in the art that some of the above-stated process steps (e.g., 110, 115 and 130) could be combined into one, or substantially eliminated without departing from the spirit of the present invention.

Figure 2:
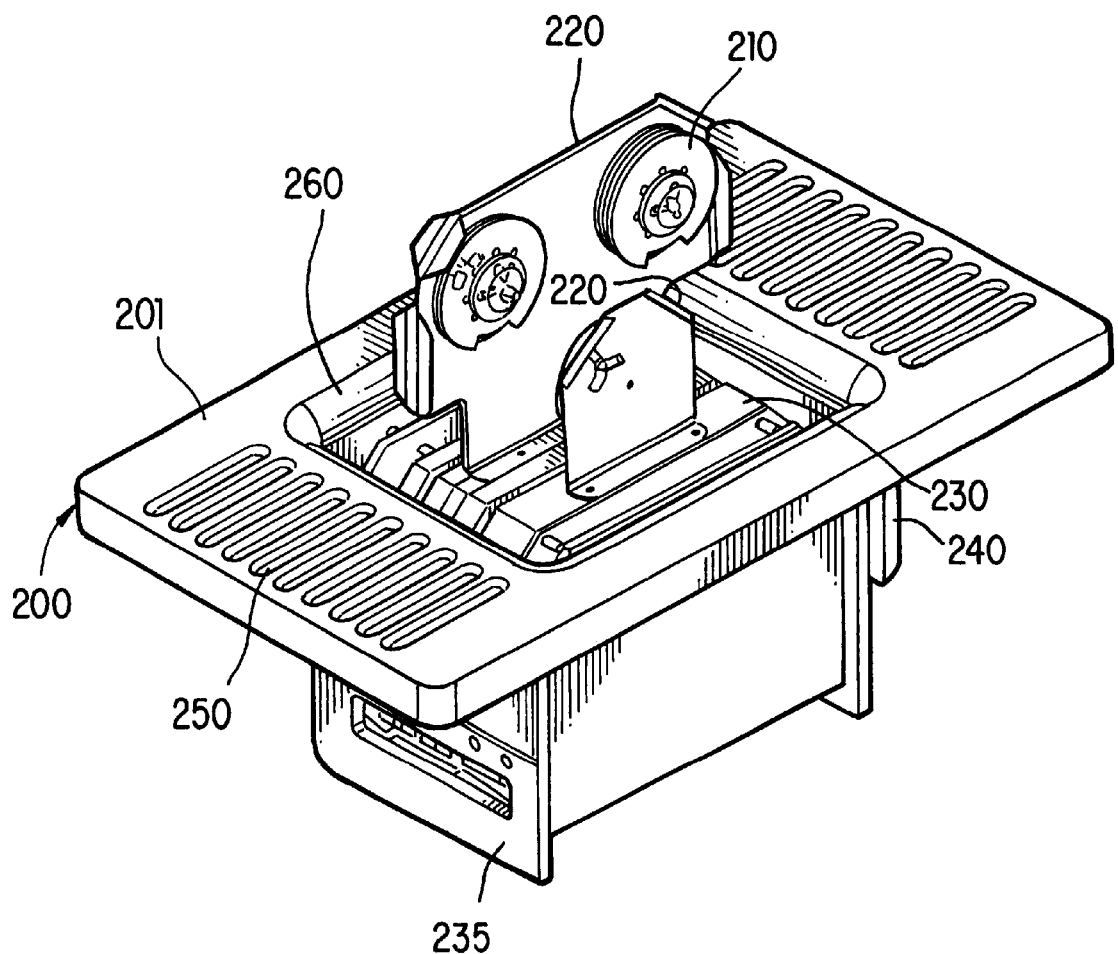
FIG. 2 is a perspective view of an embodiment of an amp pair splicing station in accordance with the principles of the present invention.

FIG. 2 is a perspective view of an embodiment of an amp pair splicing station in accordance with the principles of the present invention. An amp pair splicing station 200 can include a base 201 having a plurality of storage slots 250 and an aperture 260 for surrounding an amp pair assembly 230. Fiber transports 210 can be placed on fiber transport holders 220, which can be affixed to a corresponding optical component tray of amp pair 230. Storage slots 250 need not have any particular shape, so long as they are configured to hold fiber transports 210. A pair of amp pair anchors 240, which will be discussed in more detail later in this specification, can connect to the backside of base 201 and can border aperture 260. Amp pair 230 can be received and securely positioned in aperture 260 of splicing station 200. Amp pair 230 can typically have a pair of support plates 235 defining the two sides of the amp pair.

While in the illustrative representations of the embodiments of this invention fiber transports 210 are shown as having a disk-like shape, it will be understood by those having ordinary skill in the art that other designs are possible. Therefore, the scope of this invention should not be construed as limited only to fiber transports having a disk-like shape.

Figure 3:
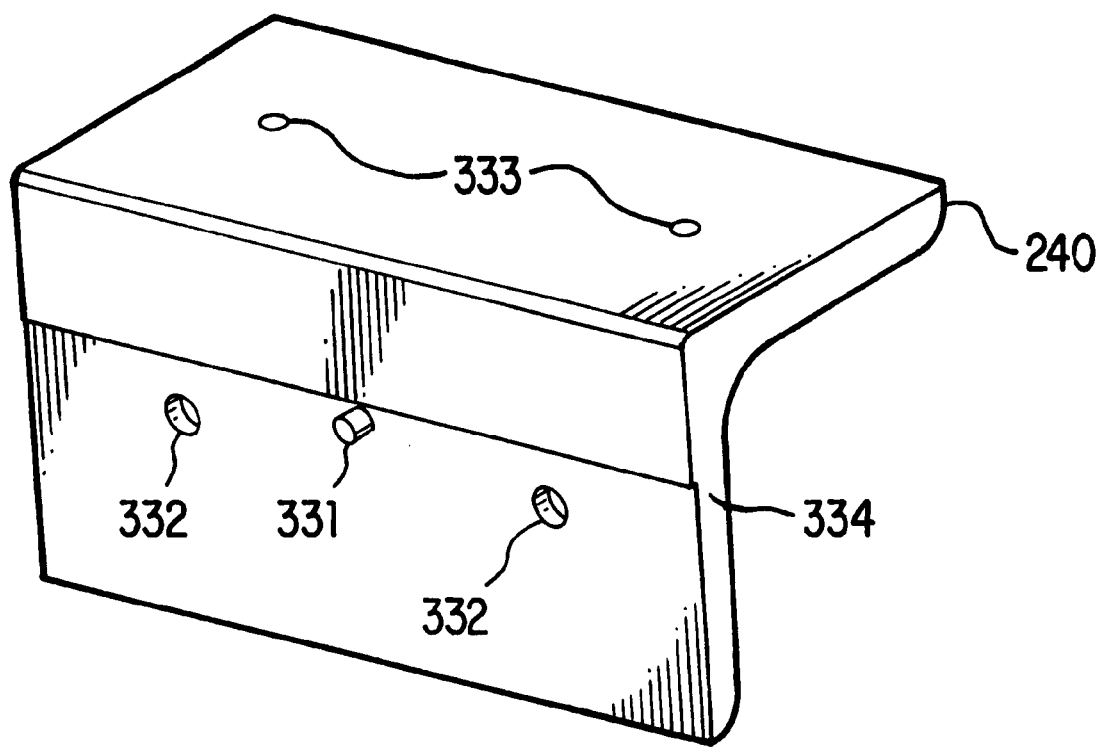
FIG. 3 is a perspective view of an embodiment of an amp pair anchor in accordance with the principles of the present invention.

FIG. 3 is a perspective view of an embodiment of an amp pair anchor 240 of an amp pair splicing station 200 in accordance with the principles of the present invention. Amp pair anchor 240 is placed in aperture 260, and receives the amp pair unit 230. Amp pair anchor 240 can include holes 333 and 332 and protrusion 331. Various mechanical fasteners, such as screws, can be used to connect angled-bracket 240 to base 200 through holes 333. Thus, amp pair anchor 240 provides means for removably engaging amp pair 230 to base 201. Protrusion 331 can have any shape so long as it engages a notch (not shown) on the support plates 235 of amp pair 230 (FIG. 2). As stated, support plates 235 are typically secured to the opposite sides of the amp pair 230. In one embodiment of the invention, indentation 334 is added to angled-bracket 240 to make it easier to maneuver and place the amp pair assembly 230 in aperture 260. Holes 332 provide additional means for fastening the angled-bracket 240 to amp pair 230 by using capturing screws such as thumb screws.

Figure 4:
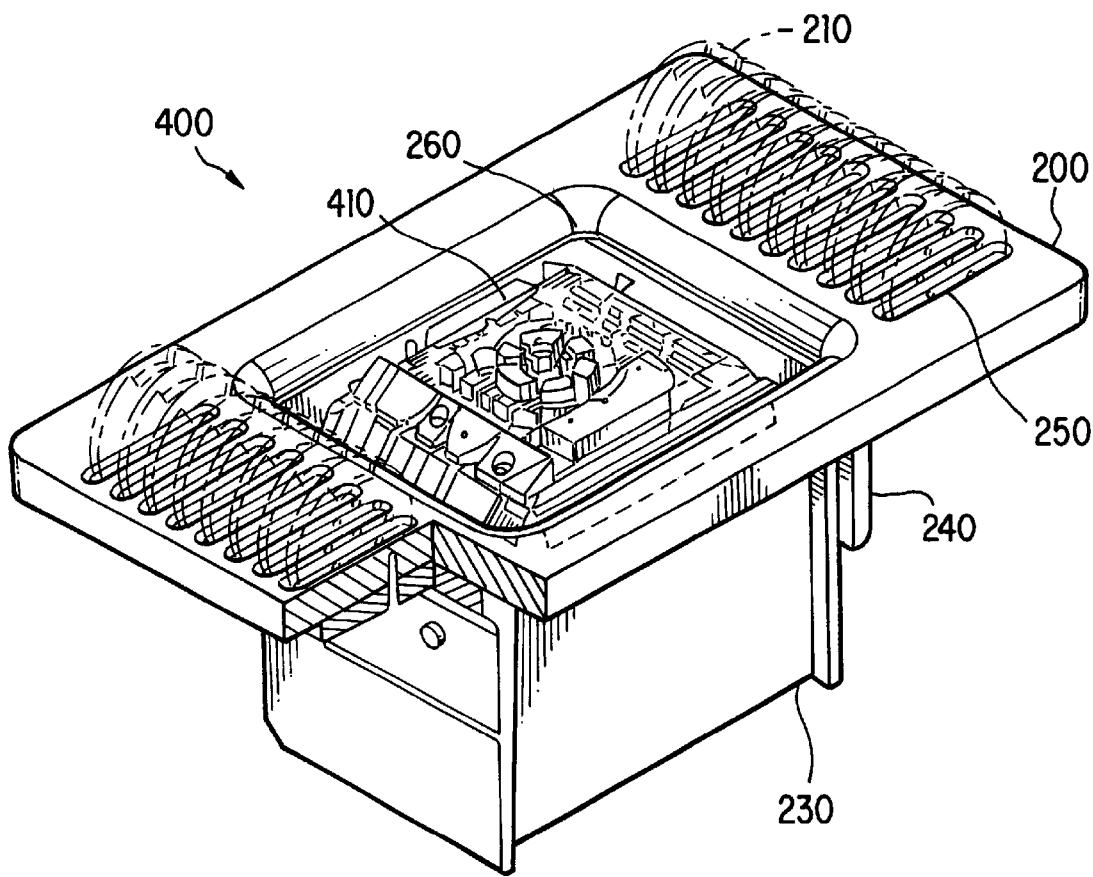
FIG. 4 is a perspective view of another view of the embodiment of an amp pair splicing station in accordance with the principles of the present invention.

Once amp pair 230 is placed in splicing station 200, and fiber transports 210 have been placed in storage slots 250, an upper storage tray 410 can be attached to amp pair 230 as illustrated in FIG. 4. This step is optional and the operator may instead proceed with placing splicing station 400 in a splicing machine. The amp pair splicing station 200 can be configured to be received by, and housed in, the splicing machine (not shown).

FIG. 4 shows that once the amp pair 230 is properly placed in amp pair splicing station 200, fiber transports 210 can be stored in storage slots 250, and fiber transport holder 220 can be removed from amp pair 230. FIG. 4 also illustrates that storage slots 250, which partially surround amp pair 230, can be situated within a working distance of the upper storage tray 410 and aperture 260. A working distance can be approximately the optimal distance between fiber transports 210 and the amp pair 230. More particularly, if storage slots 250 are placed too close to aperture 260, then the optical fibers may congest the space immediately above upper storage tray 410, limiting an operator's access to the optical fibers secured thereon, and risking damage to the fibers during the splicing operation. Such damage could include, for example, scratching or cutting an optical fiber. On the other hand, if storage slots 250 are too far from aperture 260, then an excessive length of optical fibers may be required to reach between amp pair 230 and storage slots 250. Thus, a greater length of each optical fiber could be exposed to potential damage. As an illustrative example, the working distance can be in the range of 4 to 12 inches.

Amp pair splicing station 200 can be formed from a material that does not promote electrical static discharge, such as anodized aluminum. In addition, the edges on base 200 can be rounded to prevent optical fibers from being damaged (such damage as scratching or cutting for example). For any given diameter of an optical fiber, an optical fiber cutting edge radius can be defined such that, any edge having a radius at or above the optical fiber cutting edge radius is incapable of cutting or scratching a fiber that contacts that edge.

Splicing station 200 can solve several problems facing the operator before and during the splicing operation. Splicing station 200 can enable removing transport holders 220 and fiber transports 210 from amp pair 230, thus freeing the fiber transports for splicing operation. Splicing station 200 also can free the space immediately above amp pair 230 for assembling an upper tray 410. More importantly, by providing storage slots 250, splicing station 200 can provide a secure storage space for fiber transports 210, protecting the optical fibers from potential damage, and easing the transport of amp pair 230 from one work station to another.

Any of the known techniques and machine can be used for splicing so long as the optical fibers of the various optical component trays are properly interconnected. Upon completion of this step, the operator can be left with, for example, four fiber transports each having thereon an optical fiber associated with the amp pair.

Amp pair 230 can be removed from splicing station 200 and transported to a testing station (not shown) for optical testing, and then to a network assembly station (not shown). After splicing, amp pair 230 can have, for example, at least four optical fibers each spooled about a second fiber transport that can be transported along with the amp pair.

It is noted that while in the above example after the splicing operation amp pair 230 is portrayed as having four optical fibers associated therewith, the invention is not limited thereto and could have more than or less than four optical fibers associated therewith.

In transporting the optical fibers, one option would be to store the optical fibers directly in the upper storage tray 410 (FIG. 4). As stated in the background section, however, problems can arise when access is desired to a fiber other than the outer-most fiber in the upper storage assembly.

According to another principle of the present invention, a fiber transport fixture can be adapted to mount to the amp pair, which can be called an optical fiber storage assembly. The fixture can be adapted to separately receive each optical fiber transport from the plurality of optical fiber transports thereby providing immediate access to any of the desired optical fibers.

Figure 5:
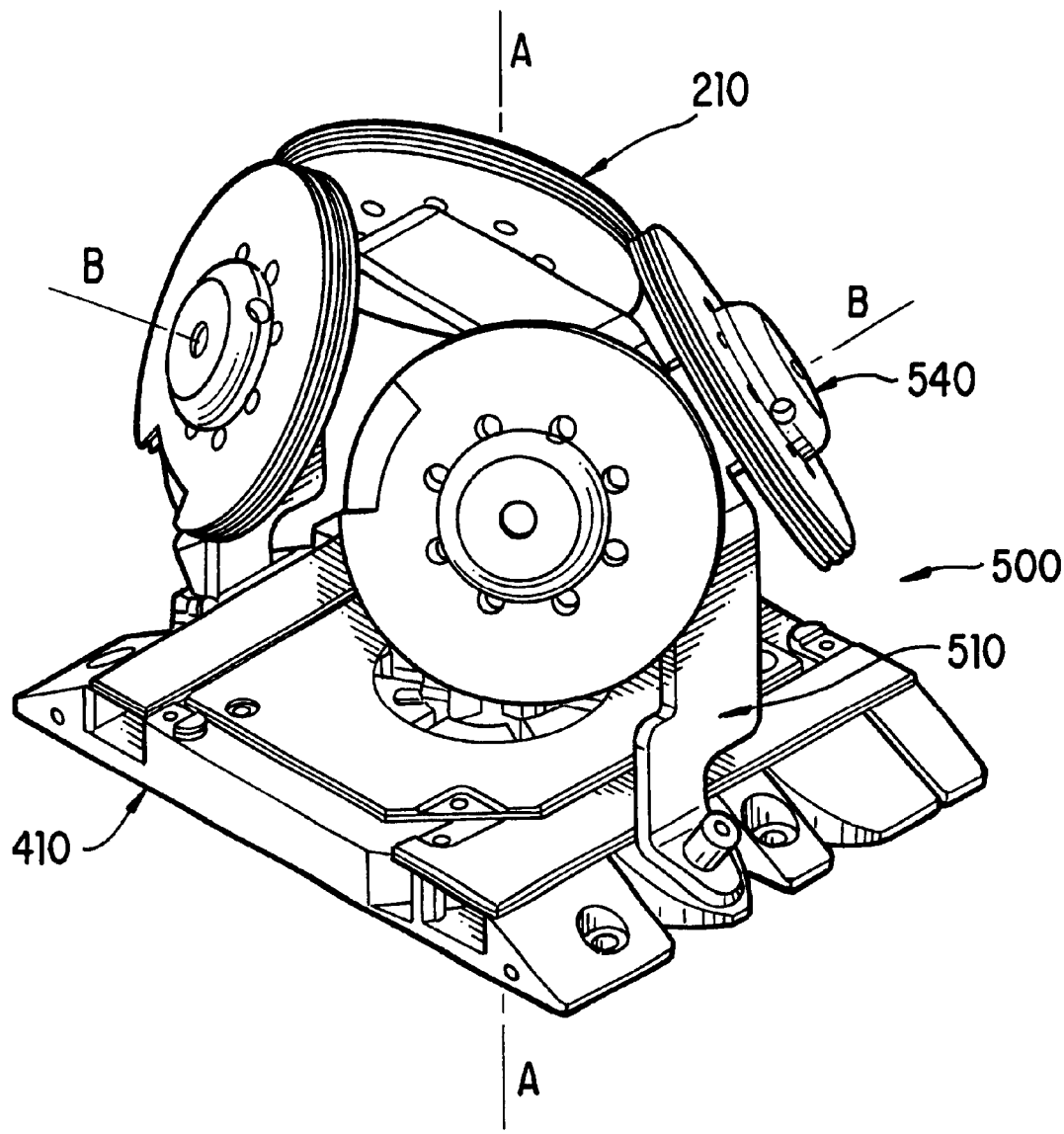
FIG. 5 is a perspective view of an embodiment of an optical fiber transport holding system in accordance with the principles of the present invention.

FIG. 5 is a perspective view of an embodiment of an optical fiber transport holding system in accordance with the principles of the present invention. System 500 includes an optical fiber transport fixture 510 that can be temporarily mounted to the upper storage tray 410. Optical fiber transport fixture 510 can releasably and separately receive a plurality of optical fiber transports 210, each of which can be independently secured to optical fiber transport fixture 510 by an optical fiber transport retainer 540.

As seen from FIG. 5, each fiber stored in the upper storage tray 410 typically can be spooled about a common spooling axis "A". When received on fixture 510, transports 530 can be closely distributed about spooling axis A, and oriented such that a coiling axis "B" of each transport 530 is approximately aligned with a radius extending spherically from spooling axis "A". In other words, the configuration of fixture 510 allows fiber transport 210 to remain within close proximity to the upper storage tray 410, thereby minimizing the space occupied by fixture 510 and transports 530. Such space minimization can be advantageous when several amp pairs are connected to one another and must be tested simultaneously.

Also, fixture 510 can be configured so that, when received on the upper storage assembly 410, fiber transports 210 are oriented such that any fiber exiting a transport 210 can reach a fiber trough (not shown), located adjacent to the fiber storage assembly 510, without excessive bending. Thus, the minimum bending radius of the fiber is not exceeded by directing the fiber from its fiber transport 210 to the fiber trough. Moreover, fixture 510 can be configured so that, when received on the upper storage tray 410, each fiber 10 transport 210 is oriented such that the minimum bending radius of any fiber exiting that transport 210 is not exceeded.

Figure 6:
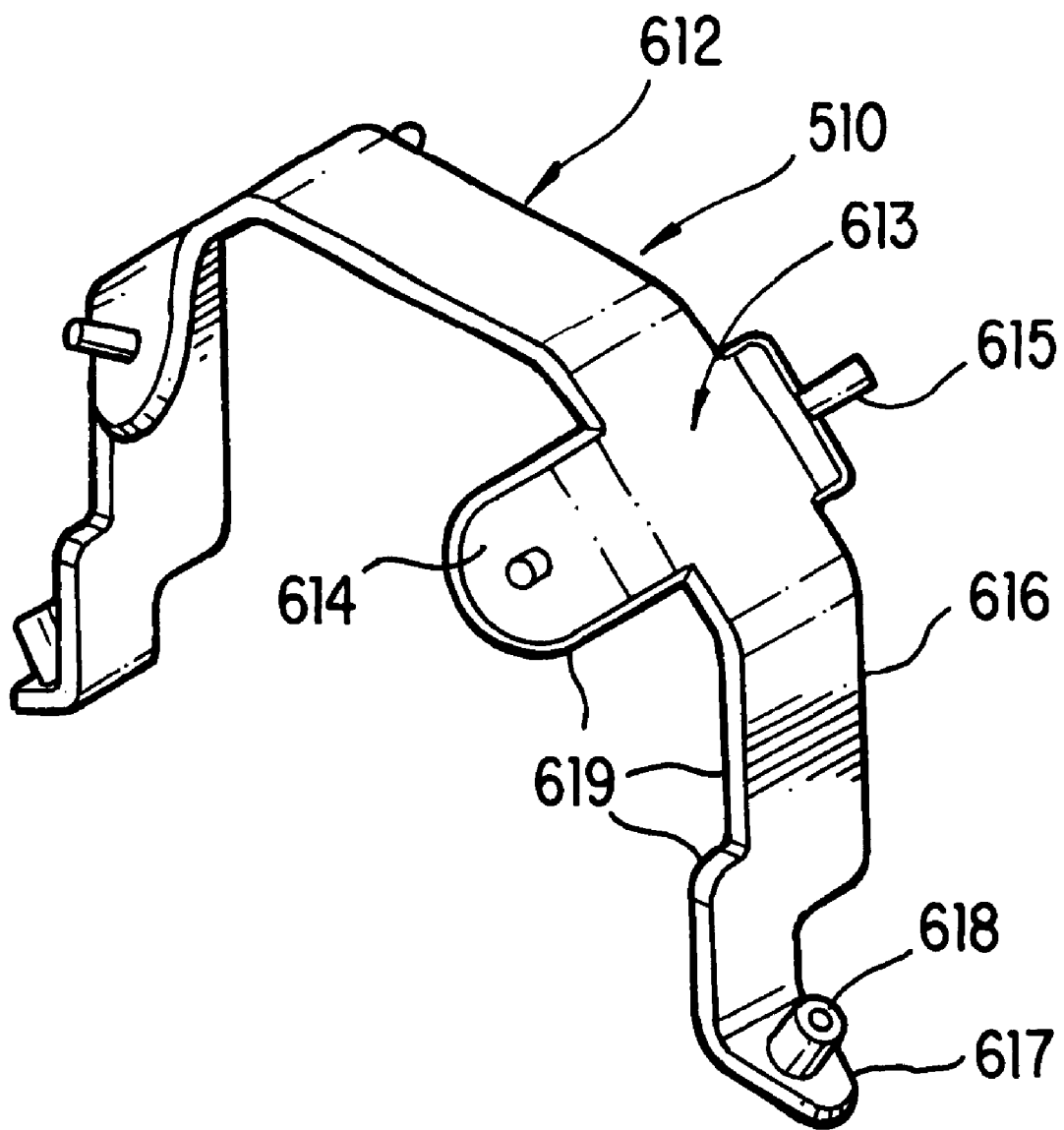
FIG. 6 is a perspective view of an embodiment of an optical fiber transport holding device in accordance with the principles of the present invention.

FIG. 6 is a perspective view of an embodiment of fixture 510. Platform 612 is connected to two shoulders 613, each of which contain two transport arms 614. Each transport arm 614 includes a transport pin 615. Each of the four transport pins 615 of fixture 510 can slidably receive a fiber transport 210, which can be releasably held on its pin 615 by a retainer 540 (shown in FIG. 5). A leg 616, and a foot 617, is connected to each shoulder 613.

The orientation of each shoulder 613, and/or each transport arm 614, can define a direction for a longitudinal axis of the corresponding transport pin 615. By distributing the axes of the transport pins 615 about a spooling axis of the fibers stored on the upper storage tray 420, fiber transports 210 can remain within close proximity to the upper storage tray 420, thereby minimizing the space occupied by fixture 110 and transports 130.

On each foot 617 is a screw housing 618 that can "capture" a screw (not shown) which is used to attach fixture 510 to the upper storage tray 410. Although capable of engaging with, and disengaging from, the upper storage tray 410, without great effort, the captured screw can not be pulled out of or otherwise escape from housing 618, and therefore it can not become loose and fall into the amp pair where it could cause an electrical short.

Fixture 510 can be formed from a material such as anodized aluminum that does not promote electrical static discharge. Every edge 619 of fixture 510 can be rounded to prevent any optical fiber from being damaged thereby. Such damage could include scratching or cutting an optical fiber. For any given diameter of an optical fiber, an optical fiber cutting edge radius can be defined such that, any edge having a radius at or above the optical fiber cutting edge radius is incapable of cutting or scratching a fiber that contacts that edge. In an illustrative example, each edge 119 of fixture 110 is rounded to a radius of at least 0.050 inches.

Using fixture 510 provides several advantages. Each optical fiber that is removed from the upper storage tray 410 can be coiled upon its own fiber transport 210. Each optical fiber transport 210 can provide a temporary storage area that is free of sharp edges and that has a spooling or coiling radius that meets or exceeds the minimum bending radius of the optical fiber. Moreover, the shape and configuration of fixture 510 can allow the plurality of fiber transports 410 to be held in close proximity to storage assembly 120 without any transport 410 contacting another transport 410. Fixture 110 also allows each fiber to be coiled on its own fiber transport 410 without disturbing any other transport 430 or its fiber.

Still other advantages of the present invention will become readily apparent to those skilled in this art from the above-recited detailed description. Accordingly, the drawings and descriptions are to be regarded as illustrative in nature, and not as restrictive. For example, fixture 510 can be configured to hold more or less than four fiber transports.

What is claimed is:

1. A method for interconnecting at least one pair of optical fibers attached to an amp pair comprising the steps of:
    storing each one of the at least one pair of optical fibers on a fiber transport attached to the amp pair;
    placing the amp pair into a splicing station;
    removing the fiber transport from the amp pair;
    splicing the at least one pair of optical fibers; and
    receiving the fiber transports on a fiber transport holder attached to the amp pair.

2. The method of claim 1, wherein said step of placing the amp pair into a splicing station further comprises the step of placing the amp pair in an aperture defined by the splicing station.

3. The method of claim 1, wherein said step of removing the fiber transport further comprises storing the fiber transport in a corresponding storage slot in the amp pair splicing station.

4. The method of claim 1, further comprising the step of attaching the fiber transport holder to a storage tray.

5. The method of claim 1, wherein the fiber transport is circular.

6. The method of claim 1, further comprising the step of detaching the fiber transport from the amp pair.

7. An apparatus adapted for working in conjunction with an amp pair having a plurality of fiber transports associated therewith, comprising:
    a base,
    an aperture defined by said base and adapted to surround the amp pair,
    a plurality of cavities defined by said base and adapted to hold the fiber transports, said cavities located within a working distance from said aperture.

8. The apparatus of claim 7, wherein said cavities are aligned collinearly.

9. The apparatus of claim 7, wherein said base is adapted to connect to a pair of stabilizer plates attached to the amp pair.

10. The apparatus of claim 7, wherein said base is adapted to connect via a pair of amp pair anchor to a pair of stabilizer plates attached to the amp pair.

11. The apparatus of claim 7, wherein said base is adapted to connect via a pair of amp pair anchor to a pair of stabilizer plates attached to the amp pair, said amp pair anchor attached to said stabilizer plates with at least one mechanical fastener.

12. The apparatus of claim 7, wherein said base is adapted to connect via a pair of amp pair anchor to a pair of stabilizer plates attached to the amp pair, said amp pair anchor connected to said base with at least one mechanical fastener.

13. The apparatus of claim 7, wherein said base further comprises a pair of amp pair anchor adapted to engage a pair of stabilizer plates attached to the amp pair via at least one protrusion on each of said amp pair anchor.

14. The apparatus of claim 7, wherein said aperture is adapted to allow the amplifier to pass therethrough.

15. A method for accessing one of a plurality of fiber transports associated with an optical amplifier for splicing, comprising:
    providing an amp pair splicing station having a base defining a plurality of storage slots;
    engaging said amp pair with the base; and
    storing each of the plurality of fiber transports in one of the storage slots.

16. The method of claim 15, wherein the base further comprises at least one pair of amp pair anchor.

17. The method of claim 15, wherein the base is removably engaged to a pair of amp pair anchor.

18. The method of claim 15, wherein the base is removably engaged to a pair of amp pair anchor, the amp pair anchor adapted to engage the amp pair.

19. The method of claim 15, wherein each of the plurality of storage slots is configured to hold one of the plurality of fiber transports.

20. The method of claim 15, wherein the base is configured to be securely received by a splicing machine.

21. The method of claim 15, wherein the base defines an aperture, the aperture positioned within a working distance from the storage slots.

22. A device for holding a plurality of optical fiber transports associated with an optical fiber storage assembly, said device comprising:
    a fixture adapted to mount to the optical fiber storage assembly and adapted to separately receive each optical fiber transport from the plurality of optical fiber transports; wherein said fixture is adapted to temporarily mount to the optical fiber storage assembly.

23. The device of claim 22, wherein said fixture has a plurality of edges, each of said edges rounded to a radius of at least 0.050 inches.

24. The device of claim 22, wherein said fixture is adapted to releasably mount to the optical fiber storage assembly via captured hardware.

25. The device of claim 22, wherein said fixture is adapted to releasably mount to the optical fiber storage assembly via mounting hardware unreleasably connected to said fixture.

26. The device of claim 22, wherein said fixture is adapted to releasably receive each optical fiber transport from the plurality of optical fiber transports.

27. The device of claim 22, wherein said fixture includes a plurality of transport receiving pins.

28. The device of claim 22, wherein said fixture includes a plurality of transport receiving pins, each transport receiving pin from said plurality of transport receiving pins capable of receiving a single optical fiber transport.

29. The device of claim 22, wherein said fixture includes a plurality of transport receiving pins, each transport receiving pin from said plurality of transport receiving pins having a longitudinal axis, each longitudinal axis being non-co-axial with the longitudinal axis of the remaining transport receiving pins from said plurality of transport receiving pins.

30. The device of claim 22, wherein said fixture includes a plurality of transport receiving pins, each transport receiving pin from said plurality of transport receiving pins having a longitudinal axis, each longitudinal axis being non-coplanar with the longitudinal axis of the remaining transport receiving pins from said plurality of transport receiving pins.

31. The device of claim 22, wherein said fixture includes a plurality of transport receiving pins distributed along spherical radii extending from a spooling axis of an optical fiber stored in the optical fiber storage assembly.

32. The device of claim 22, wherein, in an operative configuration, said fixture holds the plurality of optical fiber transports so that each optical fiber transport from the plurality of optical fiber transports can be accessed without disturbing the remainder of optical fiber transports from the plurality of optical fiber transports.

33. The device of claim 22, wherein, in an operative configuration, said fixture allows independent access to each optical fiber transport from the plurality of optical fiber transports.

34. The device of claim 22, wherein, in an operative configuration, said fixture holds the plurality of optical fiber transports so that no optical fiber transport from the plurality of optical fiber transports is in contact with another optical fiber transport from the plurality of optical fiber transports.

35. The device of claim 22, wherein, in an operative configuration, said fixture holds the plurality of optical fiber transports such that an optical fiber can be received on an optical fiber transport without exceeding a minimum bending radius of the optical fiber.

36. The device of claim 22, wherein said fixture has no sharp edges capable of damaging an optical fiber.

37. The device of claim 22, wherein said fixture has a plurality of edges, each of said edges rounded to a radius above an optical fiber cutting edge radius.

38. A method for temporarily storing an optical fiber located on an optical fiber storage assembly, said method comprising:

mounting an optical fiber transport fixture on the optical fiber storage assembly;

placing an optical fiber transport on the optical fiber transport fixture;

removing the optical fiber from the optical fiber storage assembly;

receiving the optical fiber on the optical fiber transport; and coiling the optical fiber on the optical fiber transport.

39. A device for holding a plurality of optical fiber transports in close proximity to an optical fiber storage assembly, said device comprising: a platform having a plurality of legs that are adapted to releasably mount to the optical fiber storage assembly, said platform having a plurality of pins adapted to releasably receive the plurality of optical fiber transports.

40. A system for manipulating an optical fiber comprising:

a platform having a plurality of legs releasably mounted to an optical fiber storage assembly, said platform having a plurality of pins releasably engaging a plurality of optical fiber transports.

41. A method for obtaining access to a first optical fiber stored beneath a second optical fiber on an optical fiber storage assembly, said method comprising:

mounting an optical fiber transport fixture on the optical fiber storage assembly;

placing an optical fiber transport on the optical fiber transport fixture;

receiving the second optical fiber on the optical fiber transport; and accessing the first optical fiber.

42. The method of claim 41, further comprising:

removing the first optical fiber from the optical fiber storage assembly.

43. The method of claim 41, further comprising:

coiling the second optical fiber on the optical fiber transport.

44. The method of claim 43, further comprising:

sliding the optical fiber transport over a pin attached to the optical fiber transport fixture.

45. The method of claim 41, further comprising:

releasably attaching the optical fiber transport to the optical fiber transport fixture.

46. The method of claim 41, further comprising:

removing the second optical fiber from the optical fiber storage assembly.

* * * * *